United States Patent
Shi

(10) Patent No.: US 11,425,784 B2
(45) Date of Patent: Aug. 23, 2022

(54) RADIO LINK FAILURE HANDLING METHOD AND RELATED PRODUCT

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 72 days.

(21) Appl. No.: 16/986,995

(22) Filed: Aug. 6, 2020

(65) Prior Publication Data
US 2020/0367312 A1   Nov. 19, 2020

Related U.S. Application Data

(63) Continuation of application No. 16/657,153, filed on Oct. 18, 2019, now Pat. No. 10,772,155, which is a continuation of application No. PCT/CN2018/084255, filed on Apr. 24, 2018.

(30) Foreign Application Priority Data

Feb. 7, 2018 (CN) ................. PCT/CN2018/075617

(51) Int. Cl.
*H04W 76/34* (2018.01)
*H04W 76/15* (2018.01)

(52) U.S. Cl.
CPC ........... *H04W 76/34* (2018.02); *H04W 76/15* (2018.02)

(58) Field of Classification Search
CPC ..... H04W 76/34; H04W 76/15; H04W 24/00; H04W 76/19; H04W 76/18; H04W 24/08; H04L 5/00; H04L 5/001
See application file for complete search history.

(56) References Cited

U.S. PATENT DOCUMENTS

| | | | |
|---|---|---|---|
| 8,605,674 B2 * | 12/2013 | Park | H04L 1/08 370/329 |
| 9,622,285 B2 | 4/2017 | Singh et al. | |
| 2012/0281548 A1 | 11/2012 | Lin et al. | |
| 2014/0092770 A1 | 4/2014 | Terry et al. | |

(Continued)

FOREIGN PATENT DOCUMENTS

| | | |
|---|---|---|
| CN | 101998469 A | 3/2011 |
| CN | 101998475 A | 3/2011 |

(Continued)

OTHER PUBLICATIONS

Canadian Examination Report for CA Application 3055355 dated Aug. 20, 2021. (4 pages).

(Continued)

*Primary Examiner* — Will W Lin
(74) *Attorney, Agent, or Firm* — Young Basile Hanlon & MacFarlane, P.C.

(57) ABSTRACT

A method, terminal and non-transitory computer-readable storage medium for processing a radio link failure and a related product are provided. The method includes: triggering, by the terminal, a communication failure process according to a configuration of the Radio Link Control (RLC) layer entity, when the RLC layer entity reaches a maximum number of retransmission times.

14 Claims, 5 Drawing Sheets

(56) References Cited

U.S. PATENT DOCUMENTS

| | | | |
|---|---|---|---|
| 2014/0313877 A1* | 10/2014 | Gao | H04W 72/042 |
| | | | 370/216 |
| 2014/0321263 A1 | 10/2014 | Wu | |
| 2015/0181638 A1 | 6/2015 | Tabet et al. | |
| 2017/0289021 A1* | 10/2017 | Saily | H04W 74/006 |
| 2018/0376457 A1* | 12/2018 | Tseng | H04W 72/02 |
| 2020/0275519 A1* | 8/2020 | Sharma | H04W 80/02 |

FOREIGN PATENT DOCUMENTS

| | | |
|---|---|---|
| CN | 101998496 A | 3/2011 |
| CN | 102036418 A | 4/2011 |
| CN | 102223658 A | 10/2011 |
| CN | 102870450 A | 1/2013 |
| CN | 103201977 A | 7/2013 |
| CN | 105282767 A | 1/2016 |
| CN | 105519166 A | 4/2016 |
| CN | 106332114 A | 1/2017 |
| CN | 107210888 A | 9/2017 |
| CN | 107567041 A | 1/2018 |
| RU | 2492596 C2 | 9/2013 |
| WO | 2012149898 A1 | 11/2012 |
| WO | 2014206489 A1 | 12/2014 |
| WO | 2017026263 A1 | 2/2017 |
| WO | 2017139039 A1 | 8/2017 |

OTHER PUBLICATIONS

Communication pursuant to Article 94(3) EPC for EP Application 18904808.5 dated Aug. 12, 2021. (7 pages).
International search report issued in corresponding International application No. PCT/CN2018/075617 dated Oct. 18, 2018.
EP Extended Search Report for EP application No. 18904808.5 dated Apr. 1, 2020.
3GPP TSG-RAN WG2 NR Adhoc #2; R2-1706549; Qingdao, China, Jun. 27-29, 2017; R2-1702640.
3GPP TSG-RAN WG2 Meeting #NR AH2; Qingdao, China, Jun. 27-29, 2017; R2-1706394.
3GPP TSG-RAN WG2-NR Adhoc#2; Qingdao, China, Jun. 27-29, 2017; R2-1706745.
3GPP TSG-RAN WG2-NR Ad hoc #2; Qingdao, China, Jun. 27-29, 2017; R2-1707340.
3GPP TSG-RAN WG2-NR Ad hoc 0118; Vancouver, Canada; Jan. 22-26, 2018; R2-1800858.
3GPP TSG-RAN WG2-NR Ad hoc 0118; Vancouver, Canada; Jan. 22-26, 2018; R2-1800892.
3GPP TSG-RAN WG2-NR Ad hoc #3; Vancouver, Canada; Jan. 22-26, 2018; R2-1801236.
International search report issued in corresponding International application No. PCT/CN2018/084255 dated Sep. 27, 2018.
China First Office Action with English Translation for CN Application 202010081181.0 dated Apr. 28, 2021.
Russia First Office Action with English Translation for RU Application 2019134678(068366) dated Apr. 6, 2021.
Chilie Second Office Action with English Translation for CL Application 2019-003137 dated Mar. 16, 2021.
Communication pursuant to Article 94(3) EPC Exam for EP Application 18904808.5 dated Mar. 25, 2021.
India Examination Report for IN Application 201917046683 dated Mar. 24, 2021.
First Canadian Examination Report for Application No. 3,055,355 dated Nov. 3, 2020.
European Examination Report for Application No. 18904808.5 dated Nov. 5, 2020.
Chile Examination Report with English Translation for Application No. 2019-003137 dated Nov. 16, 2020.
Japan Notice of Reasons of Refusal with English Translation for JP application 2019-558748 dated Jan. 28, 2022.
Indonesia First Examination Report with English Translation for ID application P00201909905 dated Feb. 22, 2022.
Chile Third Examination Report with English Translation for CL application 2019-003137 dated Dec. 29, 2021.
EP Communication pursuant to Article 94(3) for EP application 18904808.5 dated Jan. 31, 2022.
Korean Notification of Reason for Refusal with English Translation for KR application 10-2019-7031698 dated Mar. 16, 2022.
3GPP TS 36.331 V14.2.0 (Mar. 2017); 3rd Generation Partnership Project; Technical Specification Group Radio Access Network; Evolved Universal Terrestrial Radio Access (E-UTRA); Radio Resource Control (RRC); Protocol specification (Release 14).
3GPP TSG-RAN WG2 Meeting #98; Hangzhou, China, May 15-19, 2017; R2-1706165.
3GPP TSG-RAN WG2 Meeting #99-Bis, Prague, Czech Republic, Oct. 9-13, 2017; R2-1710137.

* cited by examiner

RADIO LINK FAILURE HANDLING METHOD AND RELATED PRODUCT

CROSS-REFERENCE TO RELATED APPLICATION

This application is a continuation application of U.S. patent application Ser. No. 16/657,153, filed on Oct. 18, 2019, which is a continuation application of International Application No. PCT/CN2018/084255, filed on Apr. 24, 2018, which claims priority to International Application No. PCT/CN2018/075617, filed on Feb. 7, 2018, and the entire disclosures of all of the above applications are hereby incorporated by reference.

TECHNICAL FIELD

The present application relates to the technical field of communication, in particular to a method for processing a radio link failure and a related product.

BACKGROUND

In a wireless communication system, a terminal detects a signal quality of a neighboring cell using a carrier according to information of the carrier sent from network side. For a carrier aggregation system such as a long-term evolution advance (LTE-A) system, etc., a terminal may have multiple carriers serving the terminal at the same time. Carrier aggregation under a base station is called an aggregation cell. When an aggregation cell provides a service for a terminal, the terminal can simultaneously use multiple uplink and downlink carriers for data transmission. If a radio link failure occurs on only a part of carriers (uplink and/or downlink), the terminal can still communicate with the base station through other carriers without failure. Only when radio link failures occur on all carriers (downlink and/or uplink), the terminal determines that the radio link fails and initiates a Radio Resource Control (RRC) connection reestablishment process to resume a signaling connection with the base station. In a current discussion of a new radio system, for an RLC entity, if a group of cells configured for a corresponding logical channel are all secondary cells, then when a certain RLC SDU of AM RLC is retransmitted up to a maximum number of times, RRC reconfiguration may not be triggered, but only the event that retransmission reaches the maximum number of times needs to be reported, thus reducing impact of reconfiguration on a terminal. However, there is no discussion on how to configure an RLC entity accordingly so far.

SUMMARY

Implementations of the present application provide a method for processing a radio link failure and a related product.

In a first aspect, an implementation of the present application provides a method for processing a radio link failure, which is applied to a terminal, wherein the terminal includes a Radio Link Control (RLC) layer entity, and the method includes: triggering a communication failure process according to a configuration of the RLC layer entity, when the RLC layer entity reaches a maximum number of retransmission times.

In a second aspect, an implementation of the present application provides a terminal. The terminal has a function of implementing actions of the terminal designed in the above method. The functions may be implemented by using hardware, or may be implemented by executing corresponding software through hardware. The hardware or software includes one or more modules corresponding to the above functions. In a possible design, the terminal includes a processor. The processor is configured to support the terminal to execute a corresponding function in the above methods. Moreover, the terminal may further include a transceiver. The transceiver is used for supporting communication between the terminal and a network device. The terminal may further include a memory. The memory is used for coupling to the processor, and storing essential program instructions and data of the terminal.

In a third aspect, an implementation of the present application provides a terminal. The terminal includes a processor, a memory, a communication interface, and one or more programs, wherein the one or more programs are stored in the memory and configured to be executed by the processor, and the program includes instructions for executing acts in any method of the second aspect in the implementation of the present application.

In a fourth aspect, an implementation of the present application provides a computer-readable storage medium. The computer-readable storage medium stores a computer program for electronic data interchange, wherein the computer program makes a computer execute all or part of acts as described in any method of the first aspect in the implementation of the present application.

In a fifth aspect, an implementation of the present application provides a computer program product, wherein the computer program product includes a non-transitory computer-readable storage medium storing a computer program and the computer program is operable to make a computer execute all or part of acts as described in any method of the first aspect in the implementation of the present application. The computer program product may be a software installation package.

BRIEF DESCRIPTION OF THE DRAWINGS

The following is a brief description of accompanying drawings which are required for describing implementations or the prior art.

DETAILED DESCRIPTION

The following describes technical solutions in implementations of the present application with reference to the accompanying drawings.

Figure 1A:
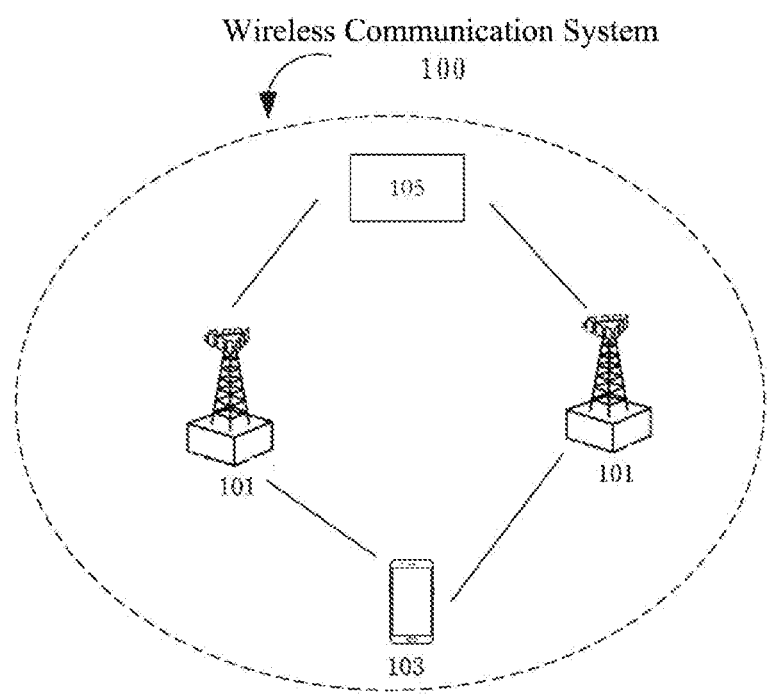
FIG. 1A is a diagram of a network architecture of a possible communication system according to an implementation of the present application.

As an example, FIG. 1A shows a wireless communication system involved in the present application. The wireless communication system 100 may work on a high frequency band, and the wireless communication system is not limited to a Long Term Evolution (LTE) system, it may be a 5th Generation mobile communication (the 5th Generation, 5G) system evolved in the future, a New Radio (NR) system, a Machine to Machine (M2M) system, or the like. The wireless communication system 100 may include: one or more network devices 101, one or more terminals 103, and a core network device 105. The network device 101 may be a base station. The base station may be used for communicating with one or more terminals, or may be used for communicating with one or more base stations with partial terminal functions (such as a macro base station and a micro base station). The base station may be a base transceiver station (BTS) in a time division synchronous code division multiple access (TD-SCDMA) system, or an evolutional node B (eNB) in an LTE system, or a base station in the 5G system or the NR system. In addition, the base station may be an Access Point (AP), a transport point (TRP), a Central Unit (CU), or other network entities, and may include parts or all of functions of the above network entities. The core network device 105 includes a device of a core network side such as an Access and Mobility Management Function (AMF) entity, a User Plane Function (UPF) entity, and a Session Management Function (SMF) entity, etc. The terminal 103 may be distributed throughout the overall wireless communication system 100, which may be static or mobile. In some implementations of the present application, the terminal 103 may be a mobile device (e.g., a smart phone), a mobile station, a mobile unit, an M2M terminal, a wireless unit, a remote unit, a user agent, a mobile client, etc.

It should be noted that the wireless communication system 100 shown in FIG. 1A is only for more clearly explaining the technical solutions of the present application, and does not constitute a limitation to the present application. Those of ordinary skill in the art should know that with evolution of network architecture and emergence of new service scenarios, the technical solutions provided by the present application are also applicable to similar technical problems.

Related technologies involved in the present application are described below.

Figure 1B:
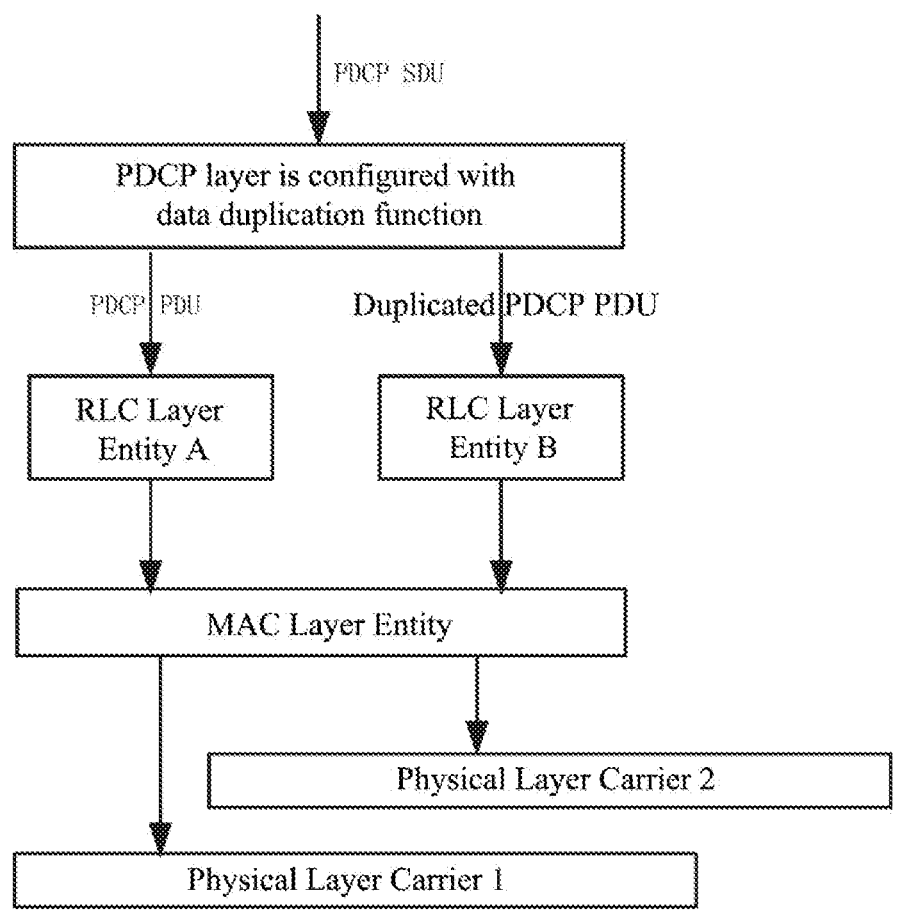
FIG. 1B is a schematic diagram of a PDCP data duplication function according to an implementation of the present application.

At present, in the 5th-Generation (5G) and NR systems, in a current discussion of NR, for data duplication, the data duplication have been carried out simultaneously based on an approach of PDCP duplication to improve reliability of data transmission. NR currently defines two architectures to support data duplication: for a case of carrier aggregation (CA), a scheme supporting data duplication utilizes a function of a PDCP layer for duplicating data to make duplicated PDCP PDUs to be transmitted to two RLC entities (two different logical channels) respectively, and finally ensures that duplicated PDCP PDUs can be transmitted on different physical layer aggregated carriers, thus achieving frequency diversity gain to improve reliability of data transmission. The specific protocol structure is shown in FIG. 1B. A logical channel corresponding to a Radio Link Control layer (RLC layer) entity can be configured with a cell or a group of cells (groups), and cells (groups) configured for two logical channels under CA duplication are different, so that duplicated PDCP PDUs can be transmitted on different carriers, thereby improving an effect of transmission diversity to achieve a purpose of improving reliability. In a discussion at the 99th meeting in a discussion of NR RAN2, there are the following conclusions: #99 Agreements 1. RLC reports maxNumberofRLC retransmissions are reached to RRC.
2. For a logical channel restricted to one or multiple SCell(s) (i.e. logical channel configured for duplication) UE reports the failure to the gNB (e.g. SCell-RLF) but no RRC re-establishment happens.

For an RLC entity, if a group of cell configured for a corresponding logical channel are all secondary cells, then when retransmission of a certain RLC SDU of AM RLC reaches a maximum number of times, RRC reconfiguration may not be triggered, and only the event that the retransmission reaches the maximum number of times may be reported, thus reducing impact of reconfiguration on a UE. However, there is no discussion on how to configure an RLC entity accordingly so far.

To address the above problem, the implementations of the present application provide following implementations, which will be described in detail below with reference to the accompanying drawings.

Figure 2:
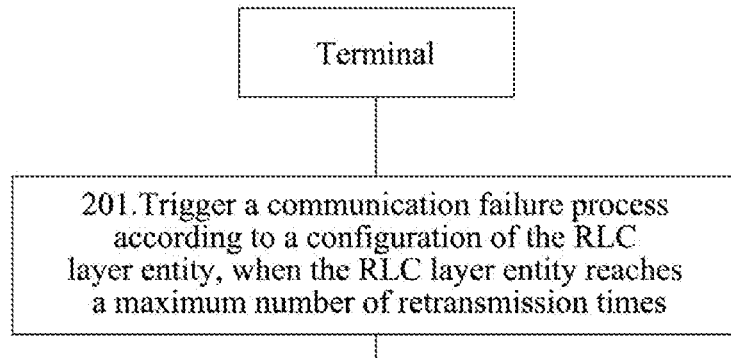
FIG. 2 is a flowchart of a method for processing a radio link failure according to an implementation of the present application.

Please refer to FIG. 2. FIG. 2 is a method for processing a radio link failure according to an implementation of the present application, which is applied to a terminal in the above example communication system. The terminal includes a Radio Link Control (RLC) layer entity. The method includes act 201.

In act 201, the terminal triggers a communication failure process according to a configuration of the RLC layer entity, when the RLC layer entity reaches a maximum number of retransmission times.

Herein, that the RLC layer entity reaches the maximum number of retransmission times refers to that the number of data retransmission times of the RLC layer reaches a preset maximum retransmission threshold, which can specifically be counted by a retransmission counter associated with an RLC Service Data Unit (SDU) processed by the RLC layer entity.

Herein, the maximum number of retransmission times can be predetermined by a protocol, and the numerical value can be 2 times, 3 times, 4 times, etc., which is not uniquely limited here.

Herein, the RLC layer is located between a Packet Data Convergence Protocol (PDCP) layer and a Medium Access Control (MAC) layer. It communicates with a PDCP layer through a Service Access Point (SAP), and communicates with a MAC layer through a logical channel. Each logical channel of each terminal has an RLC layer entity. Data received by an RLC layer entity from a PDCP layer or data sent to a PDCP layer are called an RLC SDU (or PDCP PDU). Data received by an RLC entity from a MAC layer or data sent to a MAC layer are called an RLC PDU (or MAC SDU).

A function of an RLC layer is realized by an RLC entity. An RLC entity can be configured to be in one of the following three modes: (1) Transparent Mode (TM): corresponding to a TM RLC entity, abbreviated as a TM entity. This mode can be considered as empty RLC, because only passthrough function of data is provided in this mode. (2) Unacknowledged Mode (UM): corresponding to a UM RLC entity, abbreviated as a UM entity. This mode provides all RLC functions except retransmission and re-segmentation, thus providing an unreliable transmission service. (3) Acknowledged Mode (AM): corresponding to an AM RLC entity, abbreviated as an AM entity. Through error detection and retransmission, an AM mode provides a reliable transmission service. This mode provides all RLC functions.

It can be seen that in implementations of the present application, a terminal triggers a communication failure process according to a configuration of the RLC layer entity, when the RLC layer entity reaches a maximum number of retransmission times. Since configurations corresponding to different RLC entities can be different, the terminal can distinguish different configurations of RLC layer entities to trigger different radio link failure processes, so that radio link interruptions of the terminal can be reduced as much as possible, and a link failure can be recovered in time, which is beneficial to improving reliability of wireless communication of the terminal.

In a possible example, the communication failure includes any of the following: a radio link failure, a radio link failure of a Secondary Cell Group (SCG), a radio link failure of a Secondary Cell (SCell).

Herein, the radio link failure is also called a radio link failure of a Primary Cell Group (MCG).

It can be seen that, in this example, because a communication failure process includes one of a variety of link failure situations, that is to say, in the 5G NR system, a terminal can more accurately initiate a radio link failure process, avoiding a too long interruption delay caused by not identifying a radio link failure in time, reducing radio link interruptions of the terminal as much as possible, and recovering a link failure in time, which is beneficial to improving reliability of wireless communication of the terminal.

In a possible example, a carrier set configured for a logical channel corresponding to the RLC layer entity includes a Primary Cell (PCell); and triggering the communication failure process according to the configuration of the RLC layer entity includes: triggering a radio link failure process.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer corresponding to the RLC layer entity is configured with data duplication and the data duplication is activated.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer corresponding to the RLC layer entity is configured with data duplication but the data duplication is not activated.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer configuration corresponding to the RLC layer entity is not configured with data duplication.

In this possible example, the RLC layer entity refers to a Primary Radio Link Control (RLC) layer entity under a carrier aggregation duplication function (CA duplication).

The above process of triggering the radio link failure process includes the following steps (1), (2) and (3).
(1) Suspend all radio bearers except a signal radio bearer SRB0 (suspend all RBs except SRB0).
(2) Reset a MAC layer (reset MAC).
(3) Initialize transmission of an RRC connection reestablishment request message (initiate transmission of the RRCConnectionReestablishmentRequest message).

Herein, the radio link failure is also called a radio link failure of Master Cell Group (MCG).

It can be seen that in this example, for a case that a carrier set configured for a logical channel corresponding to the RLC layer entity includes a Primary Cell (PCell), the terminal can trigger a radio link failure process according to a configuration of the RLC layer entity, suspend all radio bearers except the SRB0, reset a MAC layer, initialize transmission of RRC connection reestablishment request message, and recover a link failure in time, which is beneficial to improving reliability of wireless communication of the terminal.

In a possible example, a carrier set configured for a logical channel corresponding to the RLC layer entity includes a Primary Secondary Cell (PSCell); and triggering the communication failure process according to the configuration of the RLC layer entity includes: triggering a radio link failure process of Secondary Cell Group (SCG).

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is configured with data duplication and the data duplication is activated.

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is configured with data duplication but the data duplication is not activated.

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is not configured with data duplication.

In this possible example, the RLC layer entity refers to a Primary Radio Link Control (RLC) layer entity under a carrier aggregation duplication function (CA duplication).

The above process of triggering a radio link failure process of Secondary Cell Group (SCG) includes the following steps (4), (5) and (6).
(4) Suspend all SCG data radio data bearers and suspend transmission of the SCG part for split data bearers (suspend all SCG DRBs and suspend SCG transmission for split DRBs).
(5) Reset a SCG MAC layer (reset SCG-MAC).
(6) Initiate transmission of a SCG radio link failure message to a network (initiate transmission of the SCGFailureInformation message in accordance with 5.6.13.3).

It can be seen that in this example, for a case that a carrier set configured for a logical channel corresponding to the RLC layer entity includes a Primary Secondary Cell (PSCell), a terminal can trigger a radio link failure process of Secondary Cell Group (SCG) according to a configuration of the RLC layer entity, suspend all SCG data radio data bearers and suspend transmission of the SCG part for split data bearers, reset a SCG MAC layer, and initiate transmission of a SCG radio link failure message to a network, so as to recover a link failure in time, which is beneficial to improving reliability of wireless communication of the terminal.

In a possible example, a carrier set configured for a logical channel corresponding to the RLC layer entity only includes an SCell; and triggering the communication failure process according to the configuration of the RLC layer entity includes: triggering reporting of a radio link failure in the Secondary Cell (SCell).

In this possible example, that the carrier set configured for the logical channel corresponding to the RLC layer entity only includes the SCell specifically refers to the following situation: logical channel data corresponding to the RLC layer entity can only be transmitted on the SCell, in a case that a bearer corresponding to the RLC layer entity is configured with data duplication and the data duplication is activated.

In this possible example, the RLC layer entity refers to a Primary Radio Link Control (RLC) layer entity under a carrier aggregation duplication function (CA duplication).

In this possible example, the RLC layer entity refers to a secondary Radio Link Control (RLC) layer entity under a carrier aggregation duplication function (CA duplication).

It can be seen that in this example, for a case that a carrier set configured for a logical channel corresponding to the RLC layer entity only contains an SCell, the terminal can trigger reporting of a Secondary Cell (SCell) radio link failure according to a configuration of the RLC layer entity, and recover a link failure in time, which is beneficial to improving reliability of wireless communication of the terminal.

In a possible example, the secondary RLC refers to an RLC layer entity that no longer receives new data of a PDCP layer entity after a carrier aggregation duplication function (CA duplication) of the terminal is deactivated.

In a possible example, the Primary RLC layer entity refers to an RLC layer entity that continues to receive new data from a PDCP layer entity after a carrier aggregation duplication function (CA duplication) of the terminal is deactivated.

Figure 3:
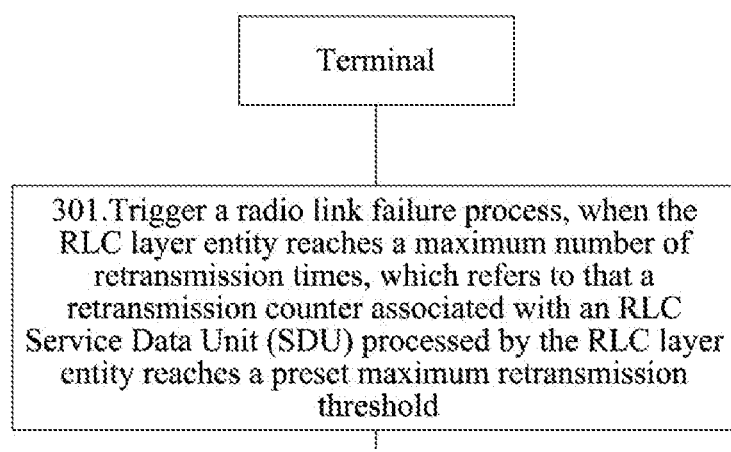
FIG. 3 is a flowchart of a method for processing a radio link failure according to an implementation of the present application.

Consistent with the implementation shown in FIG. 2, please refer to FIG. 3. FIG. 3 is another method for processing a radio link failure according to an implementation of the present application, which is applied to a terminal in the above example communication system. The terminal includes a Radio Link Control (RLC) layer entity. The method includes act 301.

In act 301, the terminal triggers a communication failure process, when the RLC layer entity reaches a maximum number of retransmission times, which refers to that a number of retransmission times of the RLC layer reaches a preset maximum retransmission threshold.

Herein, a carrier set configured for a logical channel corresponding to the RLC layer entity includes a Primary Cell (PCell), and the RLC layer entity refers to a Primary Radio Link Control (RLC) layer entity under a carrier aggregation duplication function (CA duplication).

The above process of triggering the radio link failure process includes the following steps (1), (2) and (3).
(1) Suspend all radio bearers except a signal radio bearer SRB0 (suspend all RBs except SRB0).
(2) Reset a MAC layer (reset MAC).
(3) Initialize transmission of an RRC connection reestablishment request message (initiate transmission of the RRCConnectionReestablishmentRequest message).

It can be seen that in implementations of the present application, a terminal triggers a communication failure process according to a configuration of the RLC layer entity, when the RLC layer entity reaches a maximum number of retransmission times. Since configurations corresponding to different RLC entities can be different, the terminal can distinguish different configurations of RLC layer entities to trigger different radio link failure processes, so that radio link interruptions of the terminal can be reduced as much as possible, and a link failure can be recovered in time, which is beneficial to improving reliability of wireless communication of the terminal.

In addition, for a case that a carrier set configured for a logical channel corresponding to the RLC layer entity includes a Primary Cell (PCell), the terminal can trigger a radio link failure process according to a configuration of the RLC layer entity, suspend all radio bearers except the signal radio bearer SRB0, reset a MAC layer, initialize transmission of an RRC connection reestablishment request message, and recover a link failure in time, which is beneficial to improving reliability of wireless communication of the terminal.

Figure 4:
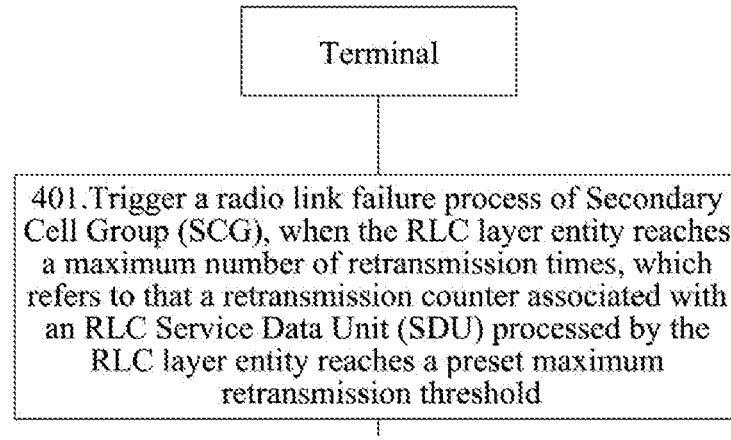
FIG. 4 is a flowchart of a method for processing a radio link failure according to an implementation of the present application.

Consistent with the implementations of FIGS. 2 and 3, please refer to FIG. 4. FIG. 4 is a method for processing a radio link failure according to an implementation of the present application, which is applied to a terminal in the above example communication system. The terminal includes a Radio Link Control (RLC) layer entity. The method includes act 401.

In act 401, the terminal triggers a radio link failure process of Secondary Cell Group (SCG), when the RLC layer entity reaches the maximum number of retransmission times, which refers to that a number of retransmission times of the RLC layer reaches a preset maximum retransmission threshold.

Herein, a carrier set configured for a logical channel corresponding to the RLC layer entity includes a Primary Secondary Cell (PSCell), and the RLC layer entity refers to a Primary Radio Link Control (RLC) layer entity under a carrier aggregation duplication function (CA duplication).

The above process of triggering the radio link failure process of Secondary Cell Group (SCG) includes the following steps (4), (5) and (6).
(4) Suspend all SCG data radio data bearers and transmission of the SCG part for split data bearers (suspend all SCG DRBs and suspend SCG transmission for split DRBs).
(5) Reset a SCG MAC layer (reset SCG-MAC).
(6) Initiate transmission of a SCG radio link failure message to a network (initiate transmission of the SCGFailureInformation message in accordance with 5.6.13.3).

It can be seen that in implementations of the present application, a terminal triggers a communication failure process according to a configuration of the RLC layer entity, when the RLC layer entity reaches a maximum number of retransmission times. Since configurations corresponding to different RLC entities can be different, the terminal can distinguish different configurations of RLC layer entities to trigger different radio link failure processes, so that radio link interruptions of the terminal can be reduced as much as possible, and a link failure can be recovered in time, which is beneficial to improving reliability of wireless communication of the terminal.

In addition, for a case that a carrier set configured for a logical channel corresponding to the RLC layer entity includes a Primary Secondary Cell (PSCell), the terminal can trigger a radio link failure process of Secondary Cell Group (SCG) according to a configuration of the RLC layer entity, suspend all SCG data radio data bearers and suspend transmission of the SCG part for split data bearers, reset a SCG MAC layer, and initiate transmission of a SCG radio link failure message to a network, so as to recover a link failure in time, which is beneficial to improving reliability of wireless communication of the terminal.

Figure 5:
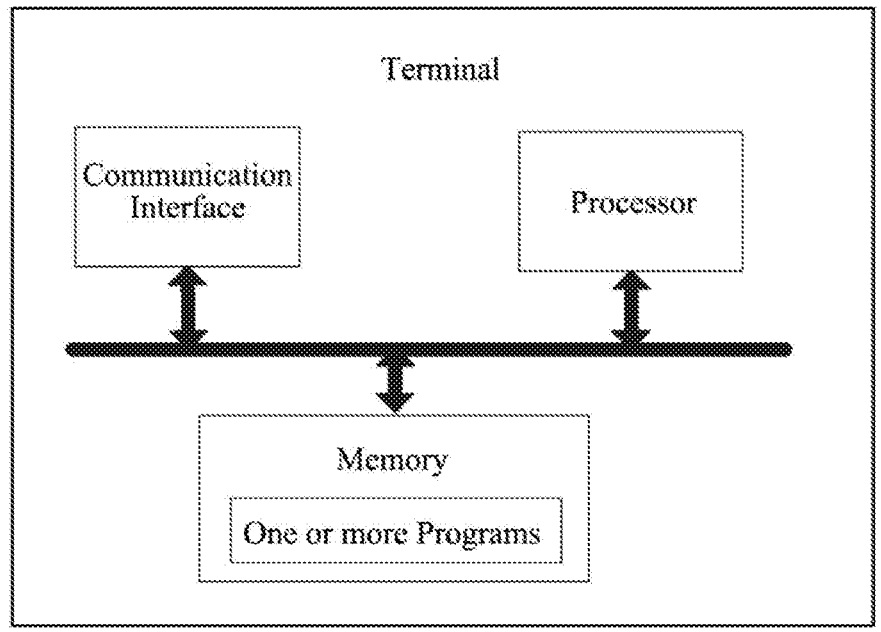
FIG. 5 is a schematic diagram of structure of a terminal according to an implementation of the present application.

Consistent with the above implementation, referring to FIG. 5, FIG. 5 is a schematic structural diagram of a terminal according to an implementation of the present disclosure. As shown in FIG. 5, the terminal includes a processor, a memory, a communication interface, and one or more programs, wherein the one or more programs are stored in the memory and configured to be executed by the processor, and the program includes instructions for performing the following acts: triggering a communication failure process according to a configuration of the RLC layer entity, when the RLC layer entity reaches a maximum number of retransmission times.

It can be seen that in implementations of the present application, a terminal triggers a communication failure process according to a configuration of the RLC layer entity, when the RLC layer entity reaches a maximum number of retransmission times. Since configurations corresponding to different RLC entities can be different, the terminal can distinguish different configurations of RLC layer entities to trigger different radio link failure processes, so that radio link interruptions of the terminal can be reduced as much as possible, and a link failure can be recovered in time, which is beneficial to improving reliability of wireless communication of the terminal.

In a possible example, the communication failure includes any of the following: a radio link failure, a radio link failure of Secondary Cell Group (SCG), a radio link failure of Secondary Cell (SCell).

In a possible example, that the RLC layer entity reaches the maximum number of retransmission times refers to that a number of retransmission times of the RLC layer reaches a preset maximum retransmission threshold.

In a possible example, a carrier set configured for a logical channel corresponding to the RLC layer entity includes a Primary Cell (PCell); and in an aspect of triggering the communication failure process according to the configuration of the RLC layer entity, the instructions in the program are specifically used for executing the following operation: triggering a radio link failure process.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer corresponding to the RLC layer entity is configured with data duplication, and the data duplication is activated.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer corresponding to the RLC layer entity is configured with data duplication but the data duplication is not activated.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer configuration corresponding to the RLC layer entity is not configured with data duplication.

In a possible example, the RLC layer entity refers to a Primary Radio Link Control (RLC) layer entity under a carrier aggregation duplication function (CA duplication).

In a possible example, a carrier set configured for a logical channel corresponding to the RLC layer entity includes a Primary Cell and Secondary Cell (PSCell); and in an aspect of triggering the communication failure process according to the configuration of the RLC layer entity, the instructions in the program are specifically used for executing the following operation: triggering a radio link failure process of Secondary Cell Group (SCG).

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is configured with data duplication and the data duplication is activated.

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is configured with data duplication but the data duplication is not activated.

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is not configured with data duplication.

In this possible example, the RLC layer entity refers to a Primary Radio Link Control (RLC) layer entity under a carrier aggregation duplication function (CA duplication).

In a possible example, a carrier set configured for a logical channel corresponding to the RLC layer entity only includes an SCell; and in an aspect of triggering the communication failure process according to the configuration of the RLC layer entity, the instructions in the program are specifically used for executing the following operation: triggering reporting of a radio link failure in the Secondary Cell (SCell).

In this possible example, that the carrier set configured for the logical channel corresponding to the RLC layer entity only includes the SCell specifically refers to the following situation: logical channel data corresponding to the RLC layer entity can only be transmitted on the SCell, in a case that a bearer corresponding to the RLC layer entity is configured with data duplication and the data duplication is activated.

In this possible example, the RLC layer entity refers to a Primary Radio Link Control (RLC) layer entity under a carrier aggregation duplication function (CA duplication).

In this possible example, the RLC layer entity refers to a secondary Radio Link Control (RLC) layer entity under a carrier aggregation duplication function (CA duplication).

In a possible example, the secondary RLC refers to an RLC layer entity that no longer receives new data of a PDCP layer entity after a carrier aggregation duplication function (CA duplication) of the terminal is deactivated.

In a possible example, the Primary RLC layer entity refers to an RLC layer entity that continues to receive new data from a PDCP layer entity after a carrier aggregation duplication function (CA duplication) of the terminal is deactivated.

The above describes the solutions provided in the implementations of the present application mainly from a perspective of interaction between network elements. It can be understood that the terminal and the network device include corresponding hardware structures and/or software modules for performing the various functions, so as to implement the above functions. A person skilled in the art should easily understand that, in combination with units and algorithm steps in examples described with reference to the implementations disclosed herein, the present application may be implemented by hardware or a combination of hardware and computer software. Whether a function is performed by hardware or computer software driving hardware depends on a particular application and a design constraint condition of the technical solution. A person skilled in the art may use different methods to implement the described functions for each particular application, but it should not be considered that such an implementation goes beyond the scope of the present application.

Division for functional units can be performed for the terminal and network device in the implementations of the present application according to the above method examples. For example, various functional units may be divided according to various functions, or two or more functions can be integrated into one processing unit. The aforementioned integrated unit may be implemented in a form of hardware, or may be implemented in a form of a software program module. It should be noted that, the division of the units in the implementations of the present application is illustrative, and is merely the division of logical functions. Other division modes may be used in actual implementations.

Figure 6:
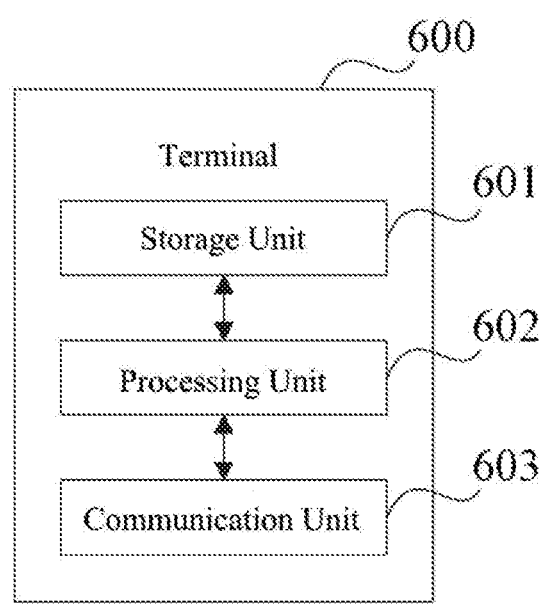
FIG. 6 is a schematic diagram of structure of a terminal according to an implementation of the present application.

In the case that an integrated unit is used, FIG. 6 illustrates a block diagram of possible composition of possible functional units of a terminal related to the above implementations. A terminal 600 includes a processing unit 602 and a communication unit 603. The processing unit 602 is used for controlling and managing acts of the terminal. For example, the processing unit 602 is used for supporting the terminal to perform act 201 in FIG. 2, act 301 in FIG. 3, act 401 in FIG. 4, and/or other processes for techniques described in this document. The communication unit 603 is used for supporting communication between the terminal and other devices, such as communication between the terminal and network device as illustrated in FIG. 5. The terminal may further include a storage unit 601 used for storing program codes and data of the terminal.

The processing unit 602 may be a processor or a controller such as a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware component, or any combination thereof. The processing unit 601 may implement or execute the various illustrative logical blocks, modules, and circuits described in combination with disclosed contents of the present application. The processor may also be a combination for implementing computing functions, e.g., a combination including one or more microprocessors, a combination of a DSP and a microprocessor. The communication unit 603 may be a transceiver or a transceiving circuit, and so on. The storage unit 601 may be a memory.

Herein, the processing unit 602 is used for triggering a communication failure process according to a configuration of the RLC layer entity, when the RLC layer entity reaches a maximum number of retransmission times through the communication unit 603.

It can be seen that in implementations of the present disclosure, the terminal triggers a communication failure process according to a configuration of the RLC layer entity, when the RLC layer entity reaches a maximum number of retransmission times. Since configurations corresponding to different RLC entities can be different, the terminal can distinguish different configurations of RLC layer entities to trigger different radio link failure processes, so that radio link interruptions of the terminal can be reduced as much as possible, and a link failure can be recovered in time, which is beneficial to improving reliability of wireless communication of the terminal.

In a possible example, the communication failure includes any of the following: a radio link failure, a radio link failure of Secondary Cell Group (SCG), a radio link failure of Secondary Cell (SCell).

In a possible example, that the RLC layer entity reaches the maximum number of retransmission times refers to that a number of retransmission times of the RLC layer reaches a preset maximum retransmission threshold.

In a possible example, a carrier set configured for a logical channel corresponding to the RLC layer entity includes a Primary Cell (PCell); and in an aspect of triggering a communication failure process according to the configuration of the RLC layer entity, the processing unit 602 is specifically used for triggering a radio link failure process.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer corresponding to the RLC layer entity is configured with data duplication and the data duplication is activated.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer corresponding to the RLC layer entity is configured with data duplication but the data duplication is not activated.

In this possible example, that the carrier set configured for the logical channel corresponding to the RLC layer entity includes the Primary Cell (PCell) specifically refers to the following situation: logical channel data corresponding to the RLC layer entity can be transmitted on the PCell, in a case that a bearer configuration corresponding to the RLC layer entity is not configured with data duplication.

In this possible example, the RLC layer entity refers to a Primary Radio Link Control (RLC) layer entity under a carrier aggregation duplication function (CA duplication).

In a possible example, a carrier set configured for a logical channel corresponding to the RLC layer entity includes a Primary Secondary Cell (PSCell); and in an aspect of triggering the communication failure process according to the configuration of the RLC layer entity, the processing unit 602 is specifically used for triggering a radio link failure process of Secondary Cell Group (SCG).

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is configured with data duplication and the data duplication is activated.

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is configured with data duplication but the data duplication is not activated.

In this possible example, that the carrier set configured for the logical channel corresponding to the RLC layer entity includes the Primary Secondary Cell (PSCell) specifically refers to the following situation: logical channel data corresponding to the RLC layer entity can be transmitted on the PSCell, in a case that a bearer corresponding to the RLC layer entity is not configured with data duplication.

In a possible example, the RLC layer entity refers to a Primary Radio Link Control (RLC) layer entity under a carrier aggregation duplication function (CA duplication).

In a possible example, a carrier set configured for a logical channel corresponding to the RLC layer entity only includes SCell; and in an aspect of triggering the communication failure process according to the configuration of the RLC layer entity, the processing unit 602 is specifically used for triggering reporting of a radio link failure of Secondary Cell (SCell).

In this possible example, that the carrier set configured for the logical channel corresponding to the RLC layer entity only includes the SCell specifically refers to the following situation: logical channel data corresponding to the RLC layer entity can only be transmitted on the SCell, in a case that a bearer corresponding to the RLC layer entity is configured with data duplication and the data duplication is activated.

In this possible example, the RLC layer entity refers to a Primary Radio Link Control (RLC) layer entity under a carrier aggregation duplication function (CA duplication).

In this possible example, the RLC layer entity refers to a secondary Radio Link Control (RLC) layer entity under a carrier aggregation duplication function (CA duplication).

In a possible example, the secondary RLC refers to an RLC layer entity that no longer receives new data of a PDCP layer entity after a carrier aggregation duplication function (CA duplication) of the terminal is deactivated.

In a possible example, the Primary RLC layer entity refers to an RLC layer entity that continues to receive new data from a PDCP layer entity after a carrier aggregation duplication function (CA duplication) of the terminal is deactivated.

When the processing unit 602 is a processor, the communication unit 603 is a communications interface, and the storage unit 601 is a memory. The terminal related to implementations of the present application may the terminal shown in FIG. 6.

An implementation of the present application also provides a computer readable storage medium. The computer readable storage medium stores a computer program for electronic data interchange, wherein the computer program makes a computer execute parts or all of the acts described for the terminal in the above method implementations.

An implementation of the present application also provides a computer readable storage medium. The computer readable storage medium stores a computer program for electronic data interchange, and the computer program causes a computer to execute parts or all of the acts described for the network device in the above method implementations.

An implementation of the present application also provides a computer program product, wherein the computer program product includes a non-transitory computer readable storage medium storing a computer program, and the computer program is operable to make a computer execute parts or all of the acts described for the terminal in the above method implementations. The computer program product may be a software installation package.

An implementation of the present application also provides a computer program product, wherein the computer program product includes a non-transitory computer readable storage medium storing a computer program, and the computer program is operable to make a computer execute parts or all of the acts described for the network device in the above method. The computer program product may be a software installation package.

The acts of the method or algorithm described in the implementations of the present application may be implemented in hardware or may be implemented by a processor executing software instructions. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An example storage medium is coupled to the processor such that the processor can read information from a storage medium, and write information to the storage medium. Of course, the storage medium may be a component of the processor. The processor and the storage medium may be located in an ASIC. In addition, the ASIC may be located in an access network device, a target network device, or a core network device. The processor and the storage medium may also act as separate components in the access network device, the target network device, or the core network device.

Those skilled in the art should realize that in one or more examples described above, the functions described in the implementations of the present application may be implemented in whole or in parts through software, hardware, firmware, or any combination thereof. When the functions described in the implementations of the present application are implemented through software, these functions may be implemented in whole or in parts in the form of a computer program product. The computer program product includes one or more computer instructions. When the computer program instructions are loaded and executed on a computer, the processes or functions are generated in whole or in parts according to the implementations of the present application. The computer may be a general purpose computer, a special purpose computer, a computer network, or other programmable devices. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc). The computer-readable storage medium may be any available medium that the computer can access, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

Purposes, technical solutions and beneficial effects of implementations of the present application are further explained in the above specific implementation modes in detail. It should be understood that the above is only the specific implementation modes of implementations of the present application, and is not used to limit the protection scope of implementations of the present application. Any modification, equivalent substitution, improvement, etc., made on the basis of technical solutions of implementations of the present application shall be included in the protection scope of implementations of the present application.

What is claimed is:

1. A method for processing a radio link failure, applied to a terminal, wherein the terminal comprises a Radio Link Control (RLC) layer entity, and the method comprises:
   triggering a communication failure process according to a configuration of the RLC layer entity, when the RLC layer entity reaches a maximum number of retransmission times;
   when a carrier set configured for a logical channel corresponding to the RLC layer entity comprises a Primary Cell (PCell), triggering the communication failure process according to the configuration of the RLC layer entity comprises:
   triggering a radio link failure process of a Master Cell Group (MCG);
   wherein the triggering the radio link failure process comprises the following steps:
   suspending all radio bearers except a signal radio bearer SRB0;
   resetting a MAC layer; and
   initializing transmission of an RRC connection reestablishment request message;
   when a carrier set configured for a logical channel corresponding to the RLC layer entity comprises a Primary Secondary Cell (PSCell); and triggering the communication failure process according to the configuration of the RLC layer entity comprises:
   triggering a radio link failure process of a Secondary Cell Group (SCG);
   wherein the triggering the radio link failure process comprises the following steps:
   suspending all radio bearers except a signal radio bearer SRB0;
   resetting a MAC layer; and
   initializing transmission of a SCG radio link failure message to a network.

2. The method of claim 1, wherein the carrier set configured for the logical channel corresponding to the RLC layer entity comprises the Primary Cell (PCell) specifically refers to a following situation: logical channel data corresponding to the RLC layer entity is allowed to be transmitted on the PCell, in a case that a bearer corresponding to the RLC layer entity is configured with data duplication and the data duplication is activated.

3. The method of claim 1, wherein the carrier set configured for the logical channel corresponding to the RLC layer entity comprises the Primary Cell (PCell) specifically refers to a following situation: logical channel data corresponding to the RLC layer entity is allowed to be transmitted on the PCell, in a case that a bearer corresponding to the RLC layer entity is configured with data duplication but the data duplication is not activated.

4. The method of claim 1, wherein the carrier set configured for the logical channel corresponding to the RLC layer entity comprises the Primary Cell (PCell) specifically refers to a following situation: logical channel data corresponding to the RLC layer entity is allowed to be transmitted on the PCell, in a case that a bearer configuration corresponding to the RLC layer entity is not configured with data duplication.

5. The method of claim 1, wherein the RLC layer entity refers to a Primary Radio Link Control (RLC) layer entity under a carrier aggregation duplication function (CA duplication).

6. The method of claim 5, wherein the Primary RLC layer entity refers to an RLC layer entity that continues to receive new data from a Packet Data Convergence Protocol (PDCP) layer entity after a carrier aggregation duplication function (CA duplication) of the terminal is deactivated.

7. The method of claim 1, wherein the carrier set configured for the logical channel corresponding to the RLC layer entity comprises the Primary Secondary Cell (PSCell) specifically refers to a following situation: logical channel data corresponding to the RLC layer entity is allowed to be transmitted on the PSCell, in a case that a bearer corresponding to the RLC layer entity is configured with data duplication and the data duplication is activated.

8. The method of claim 1, wherein the carrier set configured for the logical channel corresponding to the RLC layer entity comprises the Primary Secondary Cell (PSCell) specifically refers to a following situation: logical channel data corresponding to the RLC layer entity is allowed to be transmitted on the PSCell, in a case that a bearer corresponding to the RLC layer entity is configured with data duplication but the data duplication is not activated.

9. The method of claim 1, wherein that the carrier set configured for the logical channel corresponding to the RLC layer entity comprises the Primary Secondary Cell (PSCell) specifically refers to a following situation: logical channel data corresponding to the RLC layer entity is allowed to be transmitted on the PSCell, in a case that a bearer corresponding to the RLC layer entity is not configured with data duplication.

10. The method of claim 1, wherein a carrier set configured for a logical channel corresponding to the RLC layer entity only comprises a Secondary Cell (SCell); and triggering the communication failure process according to the configuration of the RLC layer entity comprises:
    triggering reporting of a radio link failure of the SCell.

11. The method of claim 10, wherein that the carrier set configured for the logical channel corresponding to the RLC layer entity only comprises the SCell specifically refers to a following situation: logical channel data corresponding to the RLC layer entity is only able to be transmitted on the SCell, in a case that a bearer corresponding to the RLC layer entity is configured with data duplication and the data duplication is activated.

12. The method of claim 10, wherein the RLC layer entity refers to a secondary Radio Link Control (RLC) layer entity under a carrier aggregation duplication function (CA duplication).

13. A terminal, wherein the terminal comprises a processor, a memory, and a communication interface, wherein one or more programs are stored in the memory and configured to be executed by the processor, and the one or more programs include instructions for:
    triggering a communication failure process according to a configuration of a RLC layer entity, when the RLC layer entity reaches a maximum number of retransmission times;
    when a carrier set configured for a logical channel corresponding to the RLC layer entity comprises a Primary Cell (PCell), triggering the communication failure process according to the configuration of the RLC layer entity comprises:

triggering a radio link failure process of a Master Cell Group (MCG);

wherein the triggering the radio link failure process comprises the following steps:

suspending all radio bearers except a signal radio bearer SRB0;

resetting a MAC layer; and initializing transmission of an RRC connection reestablishment request message;

when a carrier set configured for a logical channel corresponding to the RLC layer entity comprises a Primary Secondary Cell (PSCell); and triggering the communication failure process according to the configuration of the RLC layer entity comprises:

triggering a radio link failure process of a Secondary Cell Group (SCG);

wherein the triggering the radio link failure process comprises the following steps:

suspending all radio bearers except a signal radio bearer SRB0;

resetting a MAC layer; and initializing transmission of a SCG radio link failure message to a network.

14. A non-transitory computer readable medium comprising program instructions for causing a terminal to perform at least the following:

triggering a communication failure process according to a configuration of a RLC layer entity, when the RLC layer entity reaches a maximum number of retransmission times;

when a carrier set configured for a logical channel corresponding to the RLC layer entity comprises a Primary Cell (PCell), triggering the communication failure process according to the configuration of the RLC layer entity comprises:

triggering a radio link failure process of a Master Cell Group (MCG);

wherein the triggering the radio link failure process comprises the following steps:

suspending all radio bearers except a signal radio bearer SRB0;

resetting a MAC layer; and initializing transmission of an RRC connection reestablishment request message;

when a carrier set configured for a logical channel corresponding to the RLC layer entity comprises a Primary Secondary Cell (PSCell); and triggering the communication failure process according to the configuration of the RLC layer entity comprises:

triggering a radio link failure process of a Secondary Cell Group (SCG);

wherein the triggering the radio link failure process comprises the following steps:

suspending all radio bearers except a signal radio bearer SRB0;

resetting a MAC layer; and initializing transmission of a SCG radio link failure message to a network.

* * * * *